Figure 1:
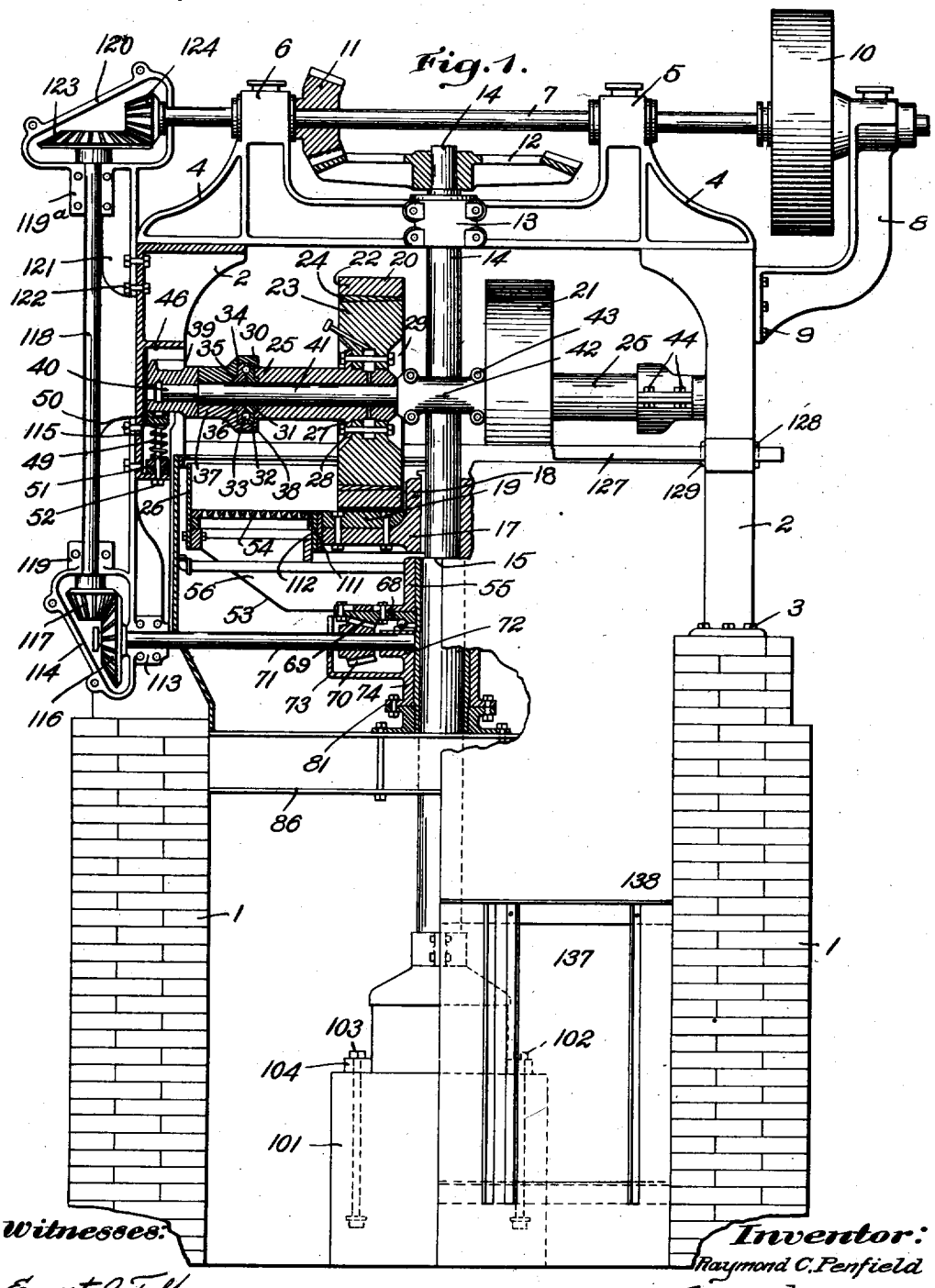

R. C. PENFIELD.

DRY PAN.

APPLICATION FILED OCT. 2, 1911.

Reissued Jan. 9, 1912.

13,356.

3 SHEETS—SHEET 1.

Witnesses:

Ernest A. Telfer

Fred W. McArdle.

Inventor:

Raymond C. Penfield by

Geo. H. Maxwell,

Att'y.

COLUMBIA PLANOGRAPH CO., WASHINGTON, D. C.

R. C. PENFIELD.

DRY PAN.

APPLICATION FILED OCT. 2, 1911.

Reissued Jan. 9, 1912.

13,356.

3 SHEETS—SHEET 2.

Witnesses:

Ernest A. Telfer

Fred'k W. Arndt

Inventor:

Raymond C. Penfield by

Geo. H. Maxwell,

Atty.

COLUMBIA PLANOGRAPH CO., WASHINGTON, D. C.

R. C. PENFIELD.

DRY PAN.

APPLICATION FILED OCT. 2, 1911.

Reissued Jan. 9, 1912.

13,356.

3 SHEETS—SHEET 3.

Witnesses:

Ernest A. Telfer

Fred W. Hobb

Inventor:

Raymond C. Penfield by

Geo. H. Maxwell,

Att'y.

COLUMBIA PLANOGRAPH CO., WASHINGTON, D. C.

UNITED STATES PATENT OFFICE.

RAYMOND C. PENFIELD, OF NEW YORK, N. Y.

DRY-PAN.

13,356. Specification of Reissued Letters Patent. Reissued Jan. 9, 1912.

Original No. 974,180, dated November 1, 1910, Serial No. 507,423. Application for reissue filed October 2, 1911. Serial No. 652,467.

*To all whom it may concern:*

Be it known that I, RAYMOND C. PENFIELD, a citizen of the United States of America, residing at New York city, in the county of New York and State of New York, have invented certain new and useful Improvements in Dry-Pans, of which the following is a specification, reference being had therein to the accompanying drawing.

My present invention relates to a rotary mill or dry pan for grinding and pulverizing clay and similar substances in the manufacture of bricks, and in kindred arts, the pan being of that class wherein the material is fed under heavy rollers or mullers located at opposite sides of the axis of revolution of the pan.

It has been found that the best practice for reducing refractory material, such as shale, for the manufacture of clay products, is through the use of a grinding pan. The principal difficulty heretofore experienced with machines of this class is to obtain a large capacity for the space they require and occupy. One of the chief reasons for not being able to obtain a large capacity has been that the speed of the pan causes the material, after it passes under the grinding mullers, to pass over the screening plates by centrifugal force too rapidly to be properly screened. My present invention provides a mechanism for overcoming this difficulty. In addition to this chief object of the invention, I may mention, among others, that the object is to provide a novel construction whereby solidity and strength are obtained with less material and labor than are required in grinding or crushing mills as ordinarily constructed, and also to provide a pan of such form and ability that it will be capable of sustaining a great amount of work with only slight liability of being broken or injured.

The invention also contemplates an improved arrangement of the grinding surfaces whereby the clay or other material may be readily supplied thereto and more speedily and perfectly ground or reduced.

The invention also comprises numerous details and peculiarities in the construction, arrangement and combination of parts substantially as will be hereinafter described and then pointed out in the claims.

Figure 2:
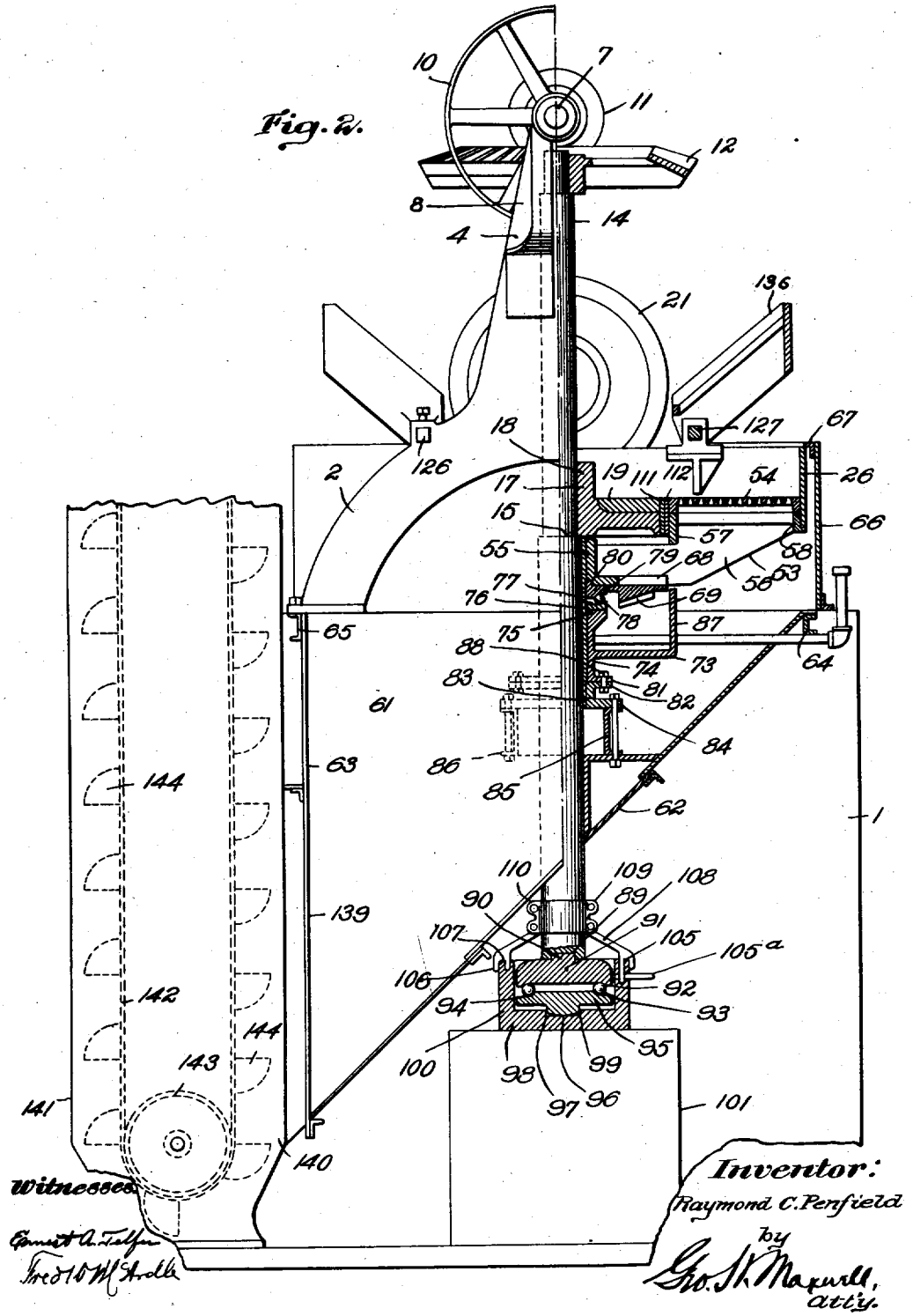
Figure 3:
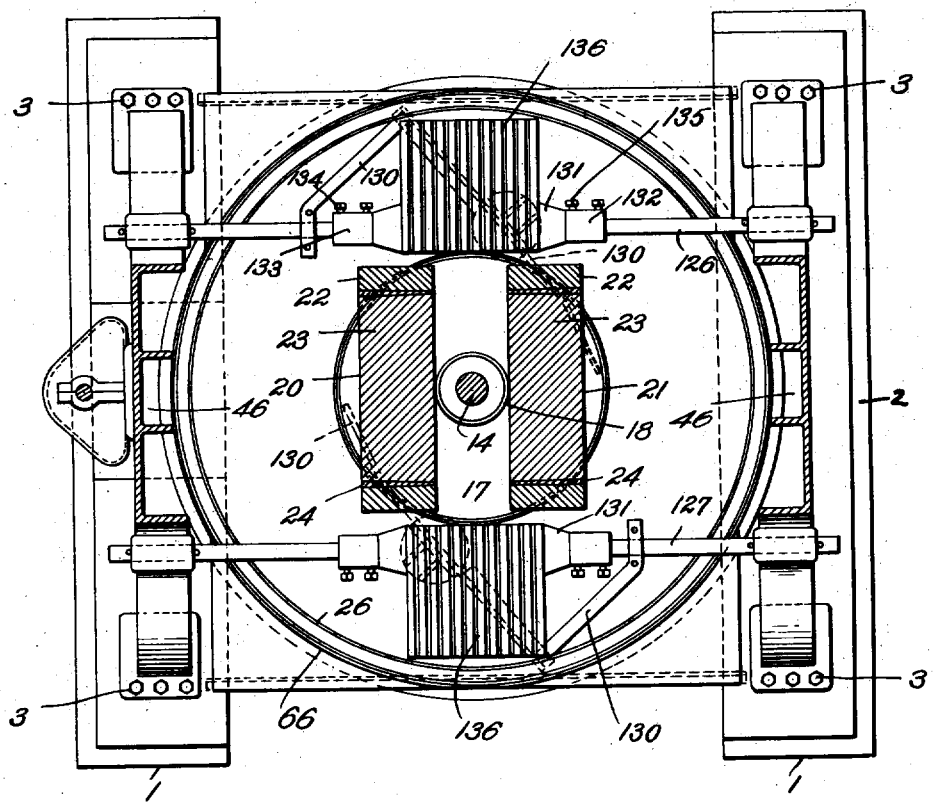

In the accompanying drawings, illustrating my invention, Figure 1 is a vertical sectional side elevation of my improved grinding pan. Fig. 2 is a similar vertical sectional side elevation at right angles to the view in Fig. 1. Fig. 3 is a sectional plan view, the mullers being conventionally shown in section without their supports.

Similar characters of reference designate corresponding parts throughout the different figures of the drawing.

1 designates a pier or foundation of brick, concrete, or other suitable material, on which the mechanical elements of the pan are mounted for operation. The side frames 2 of the main frame of the machine are securely mounted on the foundation 1, and held thereto by means of bolts 3 or other fastening devices. Upon the frames 2 is supported a horizontal cross frame 4 which is rigidly affixed to said frames 2. This frame 4 provides journal bearings 5 and 6, which are preferably built as roller bearings, and in which is rotatably mounted a horizontal shaft 7 whereon is a driving pulley 10 which may obviously be a plain pulley, or a tight and loose pulley, either of which will perform the same function as the friction pulley indicated in the drawing. A bracket 8 bolted at 9 to one of the side frames 2 provides another similar bearing for the shaft 7. The driving pulley 10 is preferably located on the shaft 7 between the bracket 8 and the bearing 5. Also on the shaft 7, contiguous to the bearing 6, is a bevel driving pinion 11 which meshes with a horizontal master gear wheel 12, that is fast on the upper end of a vertical driving shaft 14 journaled at 13 in the cross-frame 4 centrally of the machine. Vertical shaft 14 is shown in its full length in Fig. 2. At a point, say, about midway of its length, it is enlarged, thereby providing a shoulder 15 which supports a grinding base or grinding pan proper 17 whose upwardly extending hub 18 is bored to fit the upper portion of the shaft 14 to which it is keyed, as shown in Fig. 1, to revolve with drive shaft 14. The upper surface of the grinding base 17 is provided with grinding plates 19 of hard material which are securely bolted thereto, as indicated in Fig. 1. The base 17 and plates 19 constitute the main part of the grinding element on which the mullers act. Above the plates 19 are the vertical rotary wheels or mullers 20 and 21. They are the grinding devices, and, in the illustrated example of my invention, they revolve in consequence of the revolution of the pan beneath them, said pan carrying the material to be ground. These mullers 20 and 21 consist each of a rim 22 of some suitable hard material and a central portion 23. The rim 22 is secured to the central portion 23 by means of wooden wedges 24, or by some other equivalent and effective devices. The central part of the wheel section 23 is bored to receive one end of a horizontal wear sleeve 25 provided with a flange 27 which is let into a recess 28 in the central part 23 of the muller. The opposite side of the part 23 away from the recess 28 is also similarly recessed at 29 to receive the heads of the bolts which secure the flange 27 and to allow the muller to work as close as possible to the central shaft 14, since the recess serves to receive to a greater or less extent the central bearing in which the shaft 14 revolves at this point.

At the extremity of the muller sleeve 25 is an enlarged end 30, having therein a square or angular cavity 31. Fitting into this square cavity and also resting against the end of the sleeve 25 is a hardened raceway 32. Alongside of this raceway 32 and running thereon is a series of balls 33 making up a ball-bearing; and on the other side of the balls 33 away from the raceway 32 is another similar raceway 34 which is prevented from turning by having a square hub 35 which is fitted into a socket 36 formed in a collar 37 which is provided with a projecting flanged rim 38 that covers the raceways 32 and 34 as well as the balls 33 and prevents dust from working into the same. The raceways 32 and 34 and the balls 33 together constitute a thrust-bearing to take the thrusting strain of the mullers, which latter have a tendency to press outward as they revolve. Adjacent to the collar 37 is a vertically slidable shoe 39 which is carried by a shouldered square end 40 of the horizontal muller shaft 41.

Of course it will be understood that the mullers 20 and 21 are duplicates of each other, being of the same size, shape and construction, and located on opposite sides of the axis of revolution of the shaft 14 and the grinding pan, but performing similar work. In describing, therefore, the shafts on which they revolve, it will be understood that each muller has a shaft 41 located centrally inside of the muller and its sleeve 25. An entire shaft may run across the machine and have a function for both mullers. It may be designed by taking two pieces of shaft 41, one for each muller to revolve on, and placing a shoe similar to the shoe 39 at the outer end of each of these shaft sections 41, while the inner adjacent ends of said shafts 41 will be held together in some suitable manner at the center of the machine, as, for instance, by means of a pair of clamps commonly called yokes in the trade, or, as is preferred in the present instance, the shafting may be run entirely across the machine, being forged in one piece and being enlarged at the center, with the material at that point cut away sufficiently to provide an opening in which the shaft 14 will revolve, this cut-away portion of the shaft being reinforced by means of a plate 42 on one or both sides of the same held in place by bolts 43. It will be clearly manifest that as the mullers 20 and 21 are mounted on their sleeves 25, and as said sleeves are mounted on their muller shafts 41, said shafts serve as guides or journals whereon the mullers may revolve. The collars 37, already mentioned in connection with the thrust-bearings, are preferably made in halves which are secured together by means of bolts 44. The shoes 39 are rectangular in form and work up and down in guides 46 in the vertical side frames 2 (see Figs. 1 and 3). Inasmuch as the shoes 39 are carried by the square ends 40 of the muller shafts 41, and are themselves rectangular in form, working in the rectangular ways or guides 46, it is obvious that the muller shafts 41 will be prevented from revolving. At the same time the mullers are, by means of these movable shoes vertically permitted to rise and fall as the material to be ground passes under them. If a hard stone or other hard object, or refractory piece of material, or some large piece of hard material, should pass under the muller without being reduced, and the muller should drop off as it passed over the same, the shock would be received upon the springs 49 below the shoes 39 and inside of the guide casing 46 in which these shoes move. On the upper end of each spring 49 is a spring block 50, and on the lower end several spring blocks 51. Passing through said spring blocks, as well as through the center of the spring, is a bolt 52 which also is carried by a part of the side frame 2 which forms the lower end of the guide 46. It is found advantageous to provide several lower spring blocks 51 in order to employ mullers of different diameters, and also to lower the mullers or bring them relatively closer to the wearing faces of the pan as they become reduced in diameter through wear. A small amount of adjustment can also be made by closing the spring 49 to a greater or less extent by the adjustment of the bolt 52.

Revolving loosely on the lower portion or larger section 16 of shaft 14, directly below the grinding base 17, is a circular skeleton frame 53 for supporting a circular series of one or more horizontal screen plates 54 which tion on their respective parts by bolts or other securing devices, and are provided so that at any time they can be renewed to prevent the wearing of the screen-supporting frame and the outer edge of the grinding base 17. Any ordinary hard wearing substance will serve the purpose.

Shaft 71, which, as we have seen, carries, in the dust casing 73, a pinion 70 that engages a gear wheel 69 whereby the screen supporting frame and the screens are rotated, is provided on its outer end with a gear 116 located within a gear casing 114. The shaft 71, at a point near to the gear casing 114, is supported in a journal bearing 113 which forms a part of the gear casing 114, the latter being bolted to the side of the frame 2 at 115. The gear 116 meshes with a bevel pinion 117 likewise within the gear casing 114, and this pinion 117 is keyed to the lower end of a vertical shaft 118, on the upper end of which is a gear 123 which meshes with a bevel pinion 124 on the end of the upper horizontal shaft 7. The shaft 118 is supported at its lower end in a journal bearing 119 which forms a part of the gear casing 114, and at its upper end is journaled in a bearing 119ª which forms a part of the gear casing 120. Said casing 120 is bolted at its lower end 121 to the frame 2 by bolts 122. The revolution of the top shaft 7 is thus transmitted to the vertical shaft 118, and thence through the connecting gears, as explained, to the horizontal lower shaft 71 which in turn through the proper gearing actuates the screen supporting frame and the screens.

The side frames 2, 2 are tied together by suitable bracing and connecting parts, as, for instance, square tie rods shown at 126 and 127. These tie rods are held in position by keys or other equivalent means driven through slots in the same at 128 and 129, and they provide means for supporting the scraper devices 130. I lay no special claim in this case to novelty in the style of scraper, and hence have found it unnecessary to illustrate the scrapers in detail. Of course, the scraper operates to return the coarser material that will not pass through the screen plates back under the mullers so that it may be reduced further to a condition fine enough to enable it to pass through the screen. The outline of the scraper is shown in dotted lines in Fig. 3.

On one or both of the tie rods 126, 127 (see Fig. 3) is a supporting frame 131 which is furnished with hubs 132 and 133, having therein openings to receive the tie rods, as well as to receive the set screws 134 and 135. The upper surface of the frame 131 is provided with an inclined screen 136 composed of bars of metal placed close together. See Figs. 2 and 3. This screen 136 receives the material to be reduced which is delivered thereto by any suitable means not shown. It falls from the screen 136, and the coarser particles drop into the path of the grinding mullers 20 and 21, while the finer material passes directly upon the screen plates 54, and all the particles that are fine enough pass through the same, entering the lower hopper 61. By means of this elevated screen attachment the mullers are relieved from wading through a large mass of the material which is fine enough in the first instance to drop readily through the screen plates 54.

Referring again to the hopper 61 it will be noticed that it is provided with an opening 137 surrounded by a frame-work 138. At the lower end of hopper 61 is an opening 139 to allow the ground and screened material to pass out of the hopper into the boot 140 of the elevator 141, said elevator being of the well known type composed of an endless belt 142 passing over a lower pulley or drum 143 and also around other pulleys and drums not shown. This belt 142 is provided with suitable elevator buckets 144 which elevate the material to any height desired and carry it to a point where it is taken care of to suit the requirements of each case.

The operation of the pan will be readily understood from the foregoing description of the construction and arrangement of the various parts. Power is applied to the friction pulley 10 by means of a belt or in some other suitable way to rotate the shaft 7 and driving pinion 11 that meshes in the gear 12 mounted on the vertical shaft 14, thereby revolving the latter. In this way the grinding pan proper or base 17 which carries the grinding plates 19 is revolved. The material which falls upon the plates 19 passes under the mullers 20 and 21 and causes said mullers to revolve or ride upon the same. The material thus crushed by this action of the mullers passes in consequence of the centrifugal force off the grinding plates 19 and on to the screen plates 54, through which the finer material passes and is received into the hopper 61, from which it follows out by gravity through the opening 139 into the elevator boot and is elevated by buckets 144. The material that is too coarse to pass through the screen plates 54 is scraped therefrom by means of usual scrapers 130, whereby it is returned to the grinding plates to be repassed under the mullers 20 and 21 which reduce it still further, and after this the material will again pass by centrifugal action over the screen plates 54 and if now fine enough, through the openings thereof into the hopper 61 and thence into the elevator. This brings me to a more complete explanation of the principal feature of my invention, viz: the provision of means to slow down the movement or speed of rolling or lateral travel of the ground particles as they lie in substantially the same horizontal plane with the grinding plates 19 above mentioned. This screen supporting frame 53 consists essentially of a central hub 55 loose on the shaft 16, having a plurality of radial arms 56 which carry an inner circular rim 57 and an outer concentric circular rim 58. These rims 57 and 58 form seats and supports for the screen plates 54, as is clearly seen in Fig. 2, of which there may be any number, one or several. The screen plate holder 53 is thus made as a skeleton frame, in order that the material being operated upon, as it passes through the screen 54, will not be obstructed in its fall, but will readily drop below the said screen and fall into a hopper or receiving chamber 61 beneath. This may be made of any suitable material, as wood or metal, but I prefer to construct it of sheet metal, the rear portion 62 thereof being made inclined. The front part 63 is vertical and closes up the front side of the hopper. The inner sides of the foundation walls 1 provide sides for the hopper 61 and complete its construction. Said hopper 61 is supported upon steel channel bars 64 and 65 located near the top of the pier or foundation 1 (see Fig. 2). Also resting on the channel bars 64 and 65 is a vertical circular metallic ring 66, to the top of which is riveted or otherwise firmly secured an angle iron 67. This cylindrical part 66 surrounds the pan proper and the screen plates, and has the function of preventing any loose material from flying outside of the pan and confining the material as it passes through the screen plates 54 to a certain direction in its descent, so that it will necessarily fall into the receiving hopper 61. Also the pan is provided with a circular rim 26 bolted or otherwise firmly secured around the screen plates 54 or at the ends of the arms 56 and terminating at the rim or angle iron 67.

A circular ring 68 is bolted or otherwise firmly secured beneath the series of arms 56 and is provided on its lower face with gear teeth 69 which mesh with the teeth of a pinion 70 that is mounted on a shaft 71. One end of the shaft 71 is supported in a bearing 72 inside of and forming a part of a dust casing 73 that incloses the pinion 70 and the gear wheel 69. This casing 73 is provided with a central hub 74, the upper end of which is formed with a square socket 75 receiving a square projection 76 of a hardened raceway 77.

78 indicates a series of balls that rest on the hardened raceway 77, while on said balls 78 rests a second corresponding hardened raceway 79 which is provided with a square projecting flange 80 which fits into a recess in the bottom of the hub 55 of the screen supporting frame 53.

The parts 77, 78 and 79 constitute a ball bearing and thrust-bearing for supporting the weight of the screen frame 53 and its screen plates 54, and also the weight of the gear wheel 69, so that these parts may revolve freely and independently of the grinding base 17.

On the lower end of the hub 74 of the casing 73 is a flange 81 bolted to another flange 82 of a chair 83 which has a lower flange 84 secured by bolts 88 to steel channel bars 85 and 86. Said channel bars 85 and 86 and chair 83 provide a support for the dust casing 73. The bottom of the dust casing 73 is closed as indicated. On the outer edge of this bottom, and projecting upward, is a circular ring 87, concentric with the shaft 16, and this with the bottom forms the casing which protects the gear 69, pinion 70 and bearing 72 from injury by dust or other causes.

At the lower end of the section 16 of the drive shaft 14, is a square or angular socket 89 (see Fig. 2) that receives a correspondingly square projection 90 of a plate 91 which operates as a thrust plate. The lower surface of the plate 91 is formed or provided with a raceway 92 to receive a series of balls 93 forming part of a ball bearing, which balls 93 rest also in a raceway 94 of a lower thrust plate 95, whose square hub 96 is received into a square socket 97 of a step casting 98. The lower surface 99 of the thrust plate 95 is curved or spherical in shape, as shown, and rests upon the flat horizontal surface of the socket 97. The thrust plates 91 and 95 are circular in form and are surrounded by a flange 100 forming a part of the step casing 98, which latter is secured to a central foundation 101 by vertical bolts 102 and 103. These bolts pass through a bottom flange 104 shown in Fig. 1 and forming a part of the step casting 98. It will be noticed, furthermore, that in the upper peripheral edge of the circular flange or ring 100 there is a channel or groove 105 which contains oil or other fluid supplied thereto by a pipe 105[a]. Projecting over the outer wall of the oil channel 105 is a bifurcated ring 106, the rim of which projects on the outside of the wall 100, while an inner integral ring 107 lies within the groove 105. In this manner a dust-proof joint is provided whereby dust is prevented from passing into the step bearing. The rings 106 and 107 form a part of a hood 108, which latter is made in two parts, so that it can be conveniently removed from the shaft 14, and is clamped to said shaft by means of bolts passing through lugs at 109 and 110.

The outer periphery of the grinding base 17 is provided with a hard wear ring 111, and the adjoining inner part of the ring 57, which forms a part of the screen supporting frame 53, is similarly provided with a wear ring 112, these two rings 111 and 112 being quite close together. They are held in posireach the screen, without slowing down the initial propelling means, which, as shown and preferred, is the rotary grinder and centrifugal distributer or scatterer, to wit, the bottom 17 of the pan.

We have already seen that the screen plate holder or frame, with its screen or screens, is given a rotary motion which is of a different speed from that of the grinding or crushing base. The purpose of this is to increase the capacity of the machine and this result is accomplished by overcoming the otherwise too rapid passage of the ground material over the screen, as mentioned in the introduction of this patent. By this method we are enabled to increase the speed of the grinding plates and of the mullers, thereby increasing the grinding capacity of the machine, and yet at the same time run the screen at a slower speed, so that the ground material will not pass over the screen plates 54 so rapidly that it will not fall through the openings of said plates 54. In this way the capacity of the pan is very materially increased. By the mechanism provided, moreover, the grinding capacity of the pan is very much enlarged, for it is made possible to run the grinding part of the pan very fast indeed. The screening mechanism is entirely under control and can be run at such speed as is found most desirable and efficient, and as will yield the best results, and the relative speeds of the grinding mechanism and the screening devices can be changed and differently related or adjusted in order to bring about the best results in practice.

In a muller-grinding centrifugal-delivery dry-pan, and particularly in one in which all the grinding is preferably accomplished by the travel of the pan (the mullers simply rotating, and preferably not revolving), said travel has heretofore been considered to have a comparatively low maximum. For example: practice has determined that from 25 to 35 revolutions of a pan of 8 ft. to 9 ft. diameter is as fast as the pan can be run for the reason that if it is run faster, the centrifugal force is so great that the ground material flies out over the screening plates without going through. Consequently these plates practically measure the limit of the grinding and screening capacity of the ordinary pan. But I have found that simply by divorcing the centrifugal grinder and the moving screen which is so mounted as to receive the centrifugally delivered material, and by providing a proper differential movement for said grinder and said screen, it is possible for the screen to take care of a much larger amount of ground material than before.

While I prefer the form of apparatus illustrated in the drawings, in which the screening element is concentric with the grinding element, and is also in substantially the same plane therewith and likewise horizontal and is limited to forming the bottom of the dry-pan, my invention, except in the narrower aspects of its preferred embodiment, is not limited to these particulars, considered either together or separately. The principle or essence of my invention resides rather in so mounting and operating the grinder as to deliver its product by centrifugal action to a screen so mounted as to receive said material while under the influence of said action and in giving the screen a proportional movement which will coöperate with the movement of the ground material as it is received so as to pass a maximum amount thereof through the screen. To accomplish this maximum passage it is desirable that the ground material shall not halt but shall have enough movement to topple each particle over into the first available hole that it comes to and just enough to continue to roll or change the relative positions of the screen and said particle until the latter arrives at an available hole and goes through it. This is distinguished from the two extremes of stopping or clogging between holes and hence unable to get into them, and shooting over or past the holes and hence equally prevented from getting into them. Preferably therefore, the screen (by which term I mean the screening element whether in one or in several parts or members), has a forward movement, and this is sufficiently slower than the relatively fast moving particles to retard the latter as desired, but it will be evident from the foregoing explanation that my invention may be carried out in a wide variety of mechanisms within the broad spirit and scope of the invention.

Having thus described my invention, what I claim as new and desire to secure by Letters Patent is:

1. In a dry pan, the combination of a grinding member, a screening member for receiving the ground material from the grinding member, and driving mechanism for giving said two members separate differential movements, including means for operating the screening member in accordance with the requirements of the particular material being screened.

2. A dry pan having part of its container surface formed as a moving, grinding element and another part separately movable formed as a screening element, and means to move said screening element at a different speed from said grinding element.

3. A rotary dry pan having part of its bottom formed as a pulverizing element and another part formed as a screening element, said parts being separately movable, and driving connections for moving said parts at different speeds.

4. A dry pan, comprising a movable grinding element formed to deliver ground matter in a direction approximately in line with its path of movement, a screening element in position to receive the material from said grinding element, so delivered, and means for moving said grinding element and screening element separately and at different speeds.

5. A dry pan, comprising a rotary plane surface constituting a pulverizing element, a screening element in position to receive matter from said surface, driving means for said pulverizing element, the latter and said screening element being separately movable, and means for moving said screening element at a different speed from said pulverizing element.

6. A dry pan, whose bottom is composed of a plane grinding surface and a screening surface in position to receive material therefrom, said surfaces being independently movable, and means for moving said surfaces at different speeds.

7. In a dry pan, the combination of a grinding element, a screening element, said elements being concentric with each other and both situated in substantially the same horizontal plane and forming the bottom of the pan and moving at different speeds.

8. In a dry pan, the combination of a grinding element consisting of a rotary surface, a screening element, said elements being concentric with each other in substantially the same plane and forming the bottom surface of the pan, means for driving the grinding element, and means for independently driving the screening element, so that the relative speed of the two elements may be regulated.

9. In a dry pan, the combination of a grinding element consisting of a rotary surface, a screening element also consisting of a rotary surface, both situated in substantially the same plane and concentric with each other to form the bottom surface of the pan, a rim encircling the pan, and means for causing the grinding and screening elements to move independently of each other.

10. In a dry pan, the combination of a grinding means consisting of a rotary plate, mullers arranged in association therewith, a screening means also consisting of a rotary element, said grinding and screening means being located concentric with each other in substantially the same plane and forming the bottom surface of the pan, and means for actuating the screening and grinding means independently of each other.

11. In a dry pan, the combination of a grinding element, a screening element, said grinding and screening elements being located concentric with each other in substantially the same horizontal plane and forming the bottom surface of the pan, and said grinding element rotating more rapidly than the screening element so that the screening may be more effectually accomplished.

12. In a dry pan, the combination of a grinding base, driving means for operating it, grinding plates carried by said base, mullers supported above said plates, and a screening mechanism concentric with the grinding devices and moving independently thereof and at a different speed, said screening mechanism being situated in substantially the same plane with the grinding base and forming therewith the bottom surface of the dry pan.

13. In a dry pan, the combination of a central vertical drive shaft, a grinding base on the shaft, grinding plates carried by said base, mullers supported above the grinding plates and revolved by the movement of the latter, and screening mechanism concentric with the grinding base and operated at a different speed therefrom, said screening mechanism being in substantially the same plane with the grinding base and forming therewith the bottom surface of the dry pan.

14. In a rotary dry pan, the combination of a vertical drive shaft, a horizontal shaft geared thereto at the upper end, a grinding base secured to the vertical shaft, screening mechanism concentric with the grinding base, and moving independently thereof, mullers revolubly supported above the grinding devices, gearing mechanism for driving the screening mechanism, and connections consisting of shafting and gearing between the mechanism driving the screening mechanism and the upper shafting which actuates the vertical shaft.

15. In a dry pan, the combination of a grinding base, a vertical actuating shaft to which it is secured, grinding plates carried by said base, a screen-supporting frame loose on said shaft, a screen supported by said frame, a cylindrical rim encircling the screen, a gearing for actuating the screen-supporting frame, and means for driving the main shaft, all arranged so that the grinding mechanism may move independently of and at a different rate of rotation from that of the screening mechanism.

16. In a rotary dry pan, the combination of a grinding element, a screening element, said elements rotating at different speeds and being situated concentric with each other in substantially the same horizontal plane and forming the bottom surface of the pan, a receptacle beneath the screen into which the crushed material falls, a rim encircling the screen, and an outer husk surrounding the entire pan.

17. In a dry pan, the combination of a grinding base, a shaft to which it is secured, wearing plates on said base, a screen adjoining the base and moving at a different speed, said screen being concentric with the base and located in substantially the same horizontal plane and forming with the base the bottom surface of the pan, a frame supporting said screen, a receptacle beneath the screen for receiving the crushed material, said receptacle having an inclined side, and means for directing the crushed material from the screen into the receptacle.

18. In a rotary dry pan, the combination of a drive shaft, a top shaft geared thereto for actuating it, a grinding base affixed rigidly to said shaft, grinding plates carried by said base, a screen-supporting frame loose on the shaft below the grinding base, screening devices carried by said frame in the same horizontal plane as the grinding plates, gearing for imparting a rotary motion to the screen-supporting frame and the screening devices at a different rate from that of the motion of the grinding base, and means for carrying the screen-supporting frame so that it may revolve freely about the shaft, said means including a thrust bearing.

19. In a dry pan, the combination of a main frame, a horizontal shaft journaled in the upper part thereof, a vertical drive shaft geared to said upper shaft and actuated thereby, a grinding base attached to said vertical shaft, mullers supported above said base and revolved by its movement, screening devices that receive the material from the mullers, scrapers for directing uncrushed material back to the mullers, a rim surrounding the screening devices, an outer husk around the rim, means for driving the screen at a different rate of rotation from that of the grinding base, a bin beneath the screen for receiving the crushed material, and means for carrying the said material away from the bin.

20. In a dry pan, the combination of a grinding element, a screening element moving at a different speed from that of the grinding element, one or more scrapers arranged in conjunction with the screening element to direct back any coarse material to the grinding element, and a preliminary screening mechanism supported in an inclined position above the first-named screening element to receive the first delivery of the material to be crushed.

21. In a dry pan, the combination of a grinding element, means for revolving it, a screening element receiving the material after it is crushed, means for driving said screening element at a different speed from that of the grinding element, one or more scraper devices for returning back the coarse material to be reground, mullers arranged above the grinding base, and means for yieldingly supporting said mullers so that they will automatically adjust themselves.

In testimony whereof I affix my signature in the presence of two witnesses.

RAYMOND C. PENFIELD.

Witnesses:

C. V. MERTENS,

F. L. HOPLEY.

Copies of this patent may be obtained for five cents each, by addressing the "Commissioner of Patents, Washington, D. C."